United States Patent [19]
Clapp

[11] Patent Number: 5,162,843
[45] Date of Patent: Nov. 10, 1992

[54] MULTI-IMAGE PHOTOGRAPHIC PRINTER

[76] Inventor: Roy A. Clapp, 2505 S. Kiwanis Ave., Apartment 352, Sioux Falls, S. Dak. 57105

[21] Appl. No.: 753,716

[22] Filed: Sep. 3, 1991

[51] Int. Cl.⁵ ............................................. G03B 27/44
[52] U.S. Cl. ......................................... 355/46; 355/54
[58] Field of Search ................................. 355/46, 54

[56]     References Cited
     U.S. PATENT DOCUMENTS 3,951,545  4/1976  Lucht ..................................... 355/46
4,583,845  4/1986  Lucht et al. .......................... 355/46

Primary Examiner—Monroe H. Hayes

[57]          ABSTRACT

Heretofore multi-image photographic printers capable of making packages of different sized prints up to 11×14 inches, have had to incorporate a separate and complete set of objective lens arrays for each negative size to be printed. This discloses a multi-image printer which provides a large number of different sized negative apertures using only one or two sets of primary objective lens arrays in conjunction with multiple secondary optical components, these primary objectives and secondary components are each designed with a residual of aberrations of opposite nature, so that in combination these act to mutually correct each other.

7 Claims, 3 Drawing Sheets

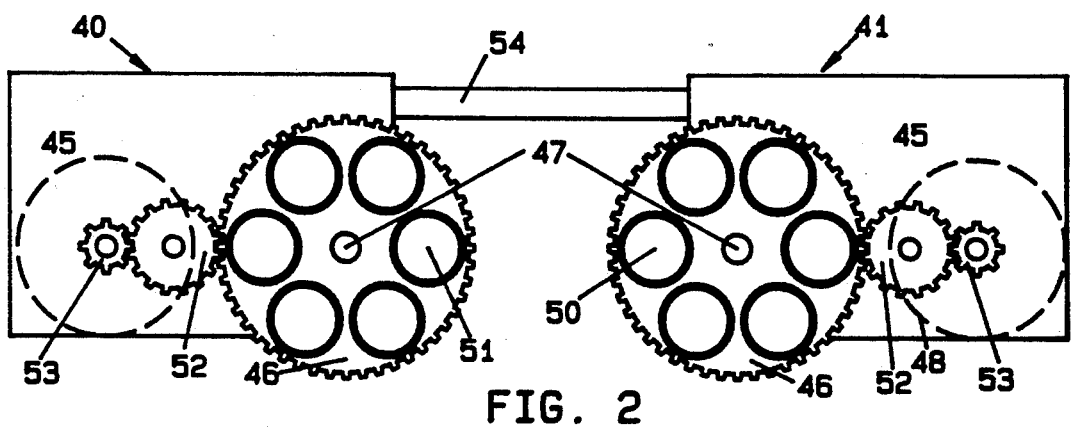
FIG. 2
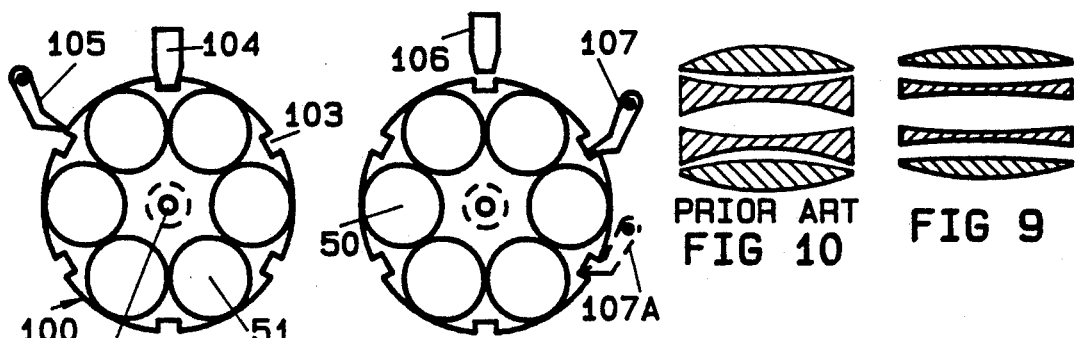
FIG 8  FIG 10 PRIOR ART  FIG 9
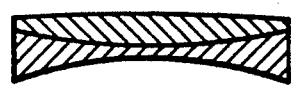
FIG 11
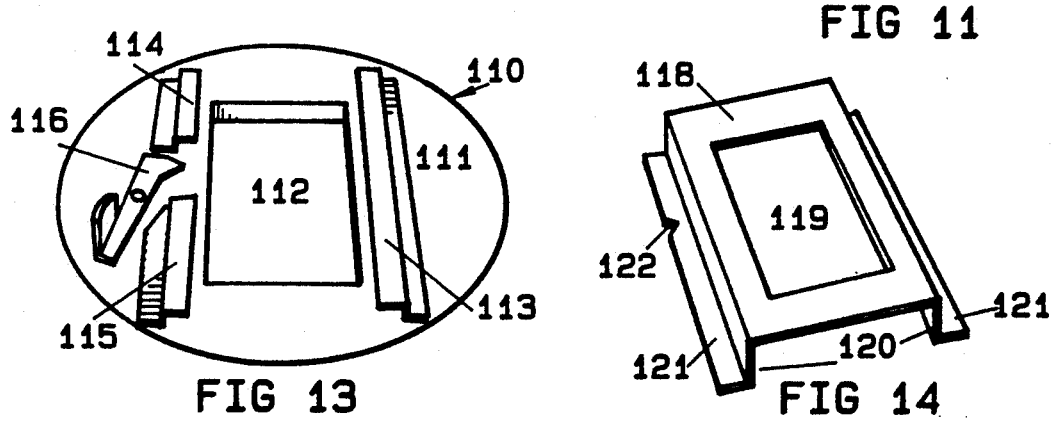
FIG 13  FIG 14
FIG 12
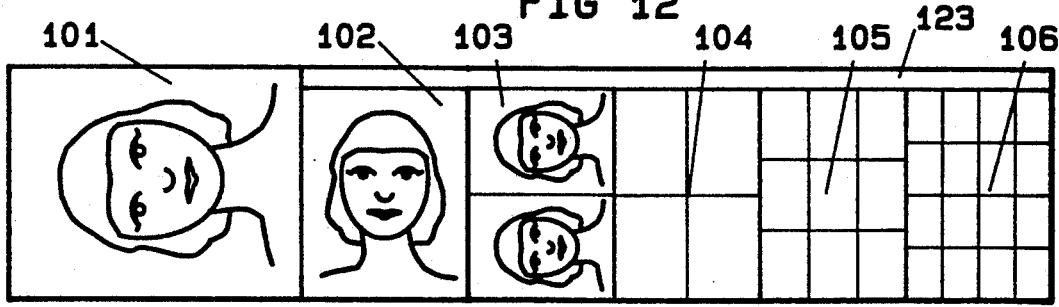

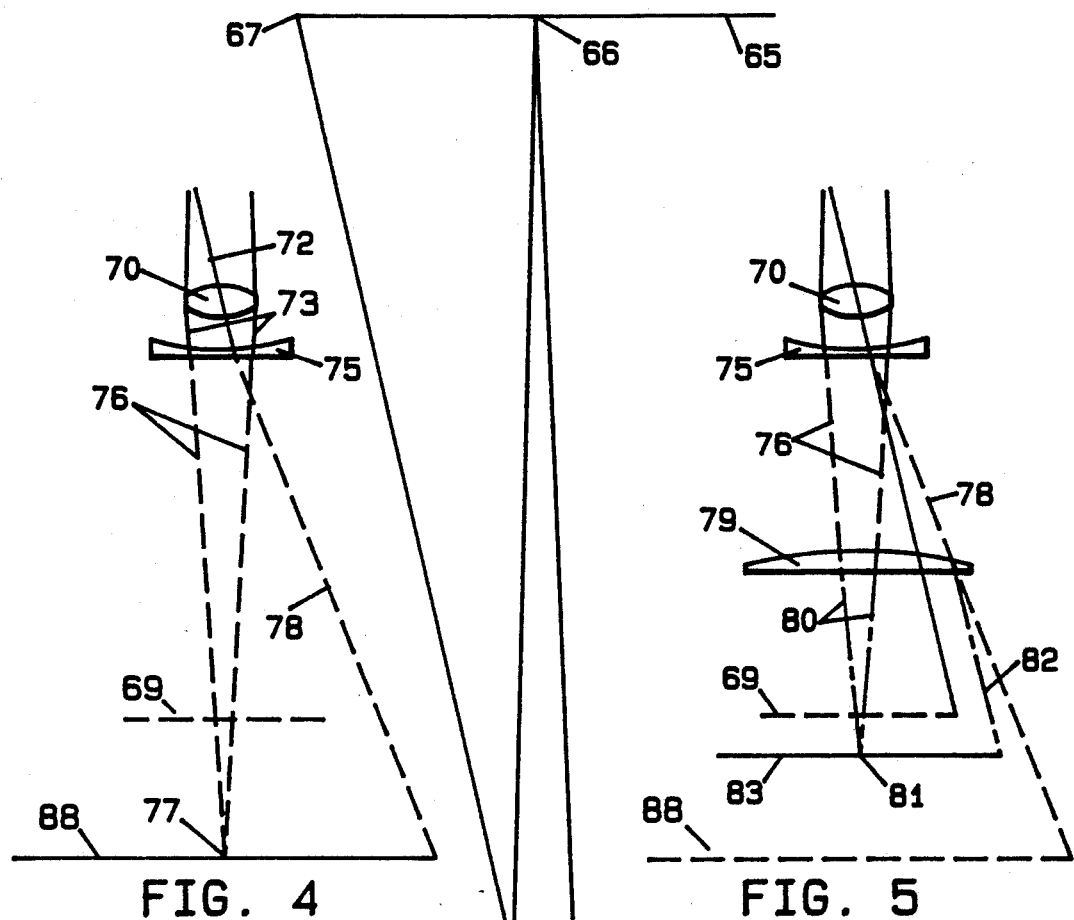
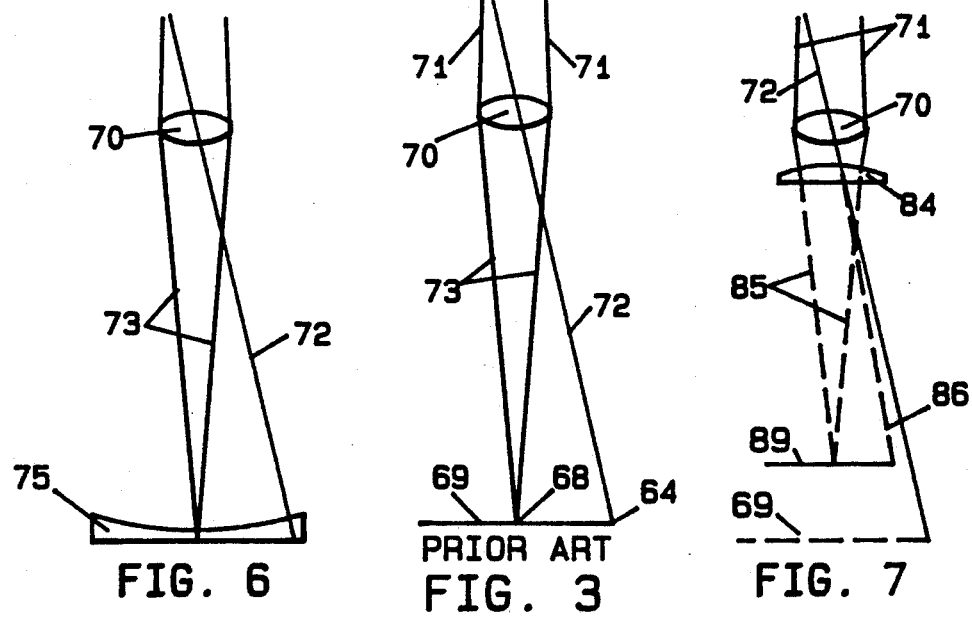
FIG. 4  FIG. 5  FIG. 6  FIG. 3 PRIOR ART  FIG. 7

MULTI-IMAGE PHOTOGRAPHIC PRINTER

FIELD OF THE INVENTION

This invention relates to apparatus for photographic printing, and particularly to a class of automated printers which produces "packages" of different sized prints from a range of different sized negative.

RELATED PRIOR ART

The first commercially manufactured printer of this type was probably by Eastman Kodak under U.S. Pat. No. 3,212,396. Introduced at the 1962 trade show, it provided a maximum print size of 5×7, and a Variety of negative sizes, by manually changing lens cabinets. This had a relatively short market life.

Later the same year, a printer by Nord Photo Engineering, Inc. of Minneapolis, offered the same print size, but with individual random access lens boards, allowing easy user programming of package content. These were manufactured to order for a single to a single negative size.

Laboratories doing processing for the trade wanted equipment that would allow the printing more than one size of negative.

In January, 1965, Nord introduced their Universal Printer, which incorporated a range of three negative sizes. This will be discussed in greater detail later.

About a month later Nord also made an 8×10 printer available, which was a single negative size machine. Some time later the same firm developed an 11×14 printer.

In the mid 1970's Lucht (U.S. Pat. No. 3,951,545) marketed the first printer which had the capacity to use all of the different negative sizes in common use. While this had the disadvantage of requiring manual changing of lens cabinets whenever a different negative size was used, it was the only equipment that offered this feature.

These lens cabinets were both heavy and bulky, especially with the advent of printers having 11×14 print capacity. Changing them was difficult, and required down time of the equipment.

This led to the development of printers that could store on line a number of complete sets of lens arrays, one for each of the common negative sizes.

One arrangement has been to mount the lens sets on a rotatable platform acting as a turntable. An alternate arrangement is to store the individual lens sub-assemblies side by side in a linear movable carriage. In either arrangement changing aperture sizes is mechanized. Each set of lenses occupies a considerable amount of space, especially in the vertical dimension. These must be mounted on a precision structure to allow positioning the assembly so that each lens array can be pushed into exact optical alignment. All this involves considerable mass. Thus it takes considerable time to change negative sizes because of inertia forces.

These machines are heavy, and necessarily require a lot of space. But above all are extremely expensive.

Candid photography often requires cropping of prints. A printer with a number of different sized negative apertures, will often have one that will crop unwanted material from a larger negative. Such use has previously required printing individually on an enlarger.

The Nord Universal Printer

This printer was equipped with a standard set of lens arrays designed and used without modification when printing 35 mm unperforated film negatives to its maximum enlargement of 5×7 inches. The machine could be manually converted to print the next smaller negative size, or the next larger negative by inserting a modifying lens and then refocusing the machine by moving the film plane.

The modifying lens was simply a magnifier in the case of the smaller film, and a minifying lens used with the larger negative. These insurable lenses were not corrected for astigmatism, spherical aberration, coma, Petzval curvature of field, or distortion. Therefore, while the standard optics were well corrected when used by themselves, the combination with a modifying lens impaired this correction. However, due to the narrow range of negative sizes, and the small enlargement involved the results were quite acceptable for that time.

With the introduction of the larger magnification required for an 8×10 inch print this rather crude device was not satisfactory, and the present 11×14 units would be even more impossible. So the concept was dropped after its first application.

A Different Principle Used in This Invention

It will help to understand the basics of this invention to review certain well known optical principles. A simple lens is afflicted with a number of complex aberrations which limit the quality of its image. For the present purpose, these aberrations will be considered positive in nature if generated by a positive lens, and negative in nature if generated by a negative lens.

Photographic objectives must be positive in order to produce a real image. These contain both positive and negative elements so that their individual aberrations cancel each other. Such systems are said to be corrected.

If an uncorrected modifying lens is added to such an objective, this balance is upset, as with the Nord Universal described earlier. To avoid this, any modifying lens would have to be also optically corrected. Because of space and other problems this is impractical if not impossible.

The present invention uses a different concept to solve this problem. If the individual objectives in a set of lens arrays are not fully corrected, but instead are designed to leave a controlled amount of residual positive aberrations, when they are combined with a second component having a similar magnitude of uncorrected negative aberrations, these residuals cancel each other.

In other words, the primary optics and a secondary lens component function as two parts of a single corrected system.

Furthermore, by utilizing the predominantly negative element of the secondary component, in place of some of the negative power within the primary objectives, all the components can be made weaker than would ordinarily be the case, which reduces troublesome higher order aberrations.

This solution of the optical problems now makes possible a multi-image printer with only one or two sets of primary lens arrays occupying fixed storage locations. Although not fully corrected by themselves, they perform their usual function of offering a large number of different print sizes. The design of the secondary optical components not only provide correction for the primary objectives but control the size of the negative aperture. By providing a variety of different components a single set of primary lens arrays can provide a large choice of negative apertures, and quickly change from one size aperture to another.

OBJECTS OF THIS INVENTION

It is an object of this invention to provide a multi-image printer that can provide rapid on line access to more different sized negative aperture choices than prior equipment. Having a larger variety of apertures greatly enhances the application to cropping of candids, a market more profitable than mass printing. To do so with moly one or two primary sets of lens arrays, occupying fixed storage locations, thus doing away with the need for movable carriages, and turntables.

To provide more compact, and less expensive equipment, which is easier to maintain.

Another object is to provide an optical system which has reduced higher order aberrations to take advantage of modern improvements in the resolving power of photographic sensitized materials.

These and other advantages will become apparent from a study of the detailed description in conjunction with the drawings.

BRIEF DESCRIPTION OF THE DRAWINGS

FIG. 2 is a plan view of gear driven carrier for secondary components.

FIG. 3 relates to prior art, being a diagram of the paths of certain key rays passing through an objective of a lens array.

FIG. 4 is a diagram illustrating the deviation of ray paths that occurs when a negative secondary optical component is introduced.

FIG. 5 is a diagram of the further alteration of the ray paths when an additional positive component is added to the secondary optical system.

FIG. 6 is a diagram serving to demonstrate the effect of location of a component.

FIG. 7 is a diagram showing the effect of a secondary optical component if the component is positive in power.

FIG. 8 shows an alternate type of secondary component carrier.

FIG. 9 is a type of primary lens adapted to use in this invention.

FIG. 10 is a prior art lens provided for comparison.

FIG. 11 is a suitable secondary component.

FIG. 12 depicts a strip of prints containing a sample exposure from each lens board.

FIG. 13 shows the rotating support for the negative carriers.

FIG. 14 shows the base of a negative carrier.

DESCRIPTION OF THE PREFERRED EMBODIMENT

Figure 1:
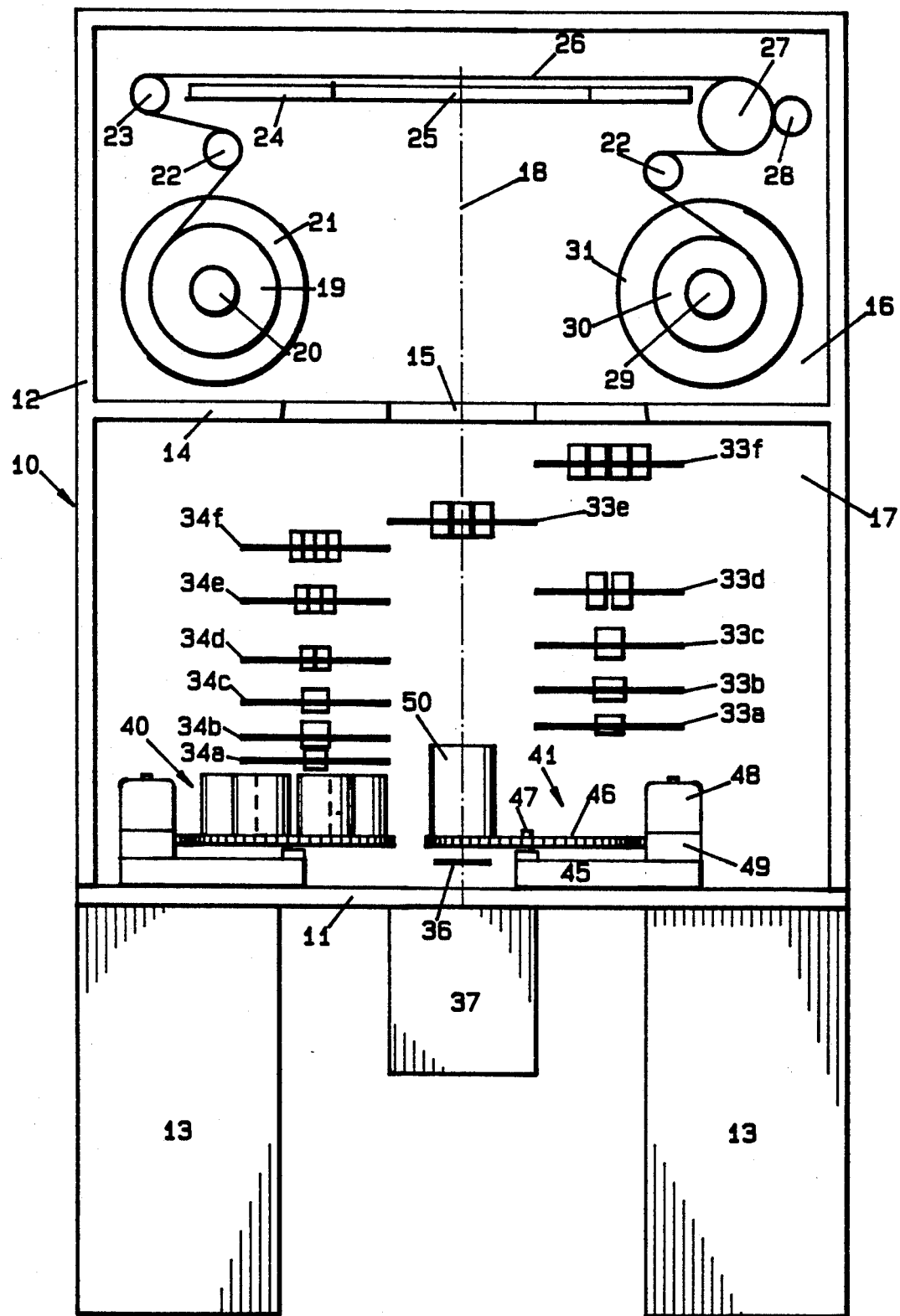
FIG. 1 is a greatly simplified, somewhat diagrammatic view of a multi-image printer embodying the present invention.

Diagrams are provided to explain how the secondary component functions to allow the use of an aperture different from that for which the primary lens sets were constructed. In this description the term "virtual negative" is used to designate the negative size and placement chosen arbitrarily for designing the set of primary objective lenses. The virtual negative is defined as the imaginary negative which would receive the rays of the primary lens arrays if the secondary optical component did not exist.

In these diagrams symbols are used to indicate lens components. Symbols which are thicker in the center such as 70, 79, and 64 are positive components, characterized by rendering parallel light convergent. The symbol 75 which is thinner in the center indicates a negative component, characterized by rendering parallel light divergent. In no case should these symbols be assumed to be pictures of the actual components, which are illustrated in FIGS. 9 and 11.

FIG. 3 illustrates certain ray paths through a general objective in a set of lens arrays as used in the prior art. A bundle of light rays bounded by the marginal rays 73—73 leaving a point 68 on the negative 60 pass though the objective 70 and are rendered convergent thereby, coming to a focus at point 66 upon the sensitized material 65. Another ray, called the principal ray, originates at the corner 64 of the negative, passes through the center of the objective and is projected to the corner of the image at the sensitized material at 67.

These ray paths are valid whether the lens 70 is well corrected or not. The difference would be that a well corrected objective will produce a sharp image, while an undercorrected or overcorrected lens will not.

A ray path can be traced in either direction through an optical system, regardless of the direction light travels over it. This makes it convenient with diagrams to start at the image and examine the path the rays take to reach it from a negative.

FIG. 4 illustrates the change in the ray paths when a negative secondary component is inserted below the objective. The rays 71—71 are identical to the same ones in FIG. 3, the rays 73—73 also travel over the same path as in FIG. 3. The same is true for the principle ray 72. If their direction wa not altered they would arrive at the original negative plane 69, located the same as in FIG. 3, which now becomes the virtual negative in the present invention.

The divergent power of the negative secondary component 75 alters the direction of the marginal rays so they come to a focus at point 77 on a real negative 88. The path of the principle ray 72 is diverted along a new path 78. It is obvious that the real negative is much larger that the virtual negative 69. The power and location of the secondary optical component determines the size of the real negative.

In FIG. 6 it is assumed the component is identical in power with the one in FIG. 4, but moved down to be in contact with the virtual negative. It will be seen that 72 and 73—73 follow their original paths, so any effect is limited to the thickness of the component. Stationing the component at some intermediated distance allows the negative size to be controlled.

Or if desired the strength of the component can be varied while the location is maintained constant.

FIG. 5 shows still another way to secure a desired negative size is to add a positive component 79 following the negative one. Here the ray paths are twice altered, the original marginal rays, aimed to focus on the virtual negative, are diverted to path 76—76 aiming at negative plane 88. But encountering the positive component 79 they are diverted again to follow path 80 and focus at point 81 on a real negative 83. By correctly coordinating the movements of components 75 and 79, the negative size can be continuously variable.

Finally FIG. 7 shows the result of using a positive secondary component. The marginal rays are rendered even more convergent 85 so they focus closer to the objective 70 onto a negative 89. The principal ray 72 diverted inward along the altered path 86. In this case the real negative is smaller than the virtual negative 69.

While all of these diagrams represent arrangements that will function, there is one combination more favorable than the others. The objectives comprising the primary array must be positive, but the secondary component can be either positive or negative.

If the objectives are designed to be undercorrected, leaving residuals that require a negative lens to correct, the secondary component can be an undercorrected negative system which restores the correction as it also alters the ray paths to accommodate a changed negative size. This permits a reduction in the strength of all the elements and results in a substantial reduction in higher order aberrations. The comparison is shown between an old objective shown in FIG. 10, which is a well known lens, compared with an objective suitable for use with this invention depicted in FIG. 8. This was represented in FIG. 4 and some other diagrams by the symbol 70.

FIG. 11 illustrates a suitable construction for a negative secondary component. This was represented in FIG. 4 by the symbol 75.

With the combination of FIG. 4 the real photographic negative is always larger than the virtual negative. The precise size is governed by the design and location of the secondary component. The stronger the lens, and the further it is placed above the plane of the virtual negative the larger the real negative. Each different sized negative aperture has a different working distance below the plane of the virtual negative.

Having explained in detail the optical combinations that can provide an unlimited choice of negative apertures, without needing a full set of negative arrays for each aperture, an operating printer will now be described.

Referring to FIG. 1, the multi-image printer 10 is structurally conventional in many ways. It is shown with the front covers removed to display the working parts. A table top 11 is supported on two cabinets 13—13, a housing 12 mounted on this table excludes room light during the printing operation.

This housing is divided into two compartments by the partition 14. The upper compartment 16 comprises the paper cabinet. At its left side a roll of unexposed sensitized material 19 is supported on a spindle 20. A flange 21 acts as a back stop when loading. At its right side, a take-up spindle 29 supports the exposed material 30 and a flange 31 guides the material as it is wound up. There are two dancer rollers 22—22, a support roller 23, a printing mask 24, having a printing aperture 25 therein, a feed roller 27 with a pinch roller 28.

The sensitized material 26 is threaded to the right of the first dancer roller, then over the support roller, thence across the printing aperture to pass between the feed roller 27 and the pinch roller 28. The web passes around the second dancer roller and is wound up on the take-up spindle 25.

Immediately after the exposure, the feed roller advances the exposed area, to bring a fresh section of material over the print aperture. This feed action is rapid so that the left dancer roller acting against its spring pressure, provides this supply. It takes more time for the mass of the roll 19 to move, which the action of the dancer rollers provide. A similar action takes place at the opposite side of the cabinet.

While the constructional details shown and described may vary with different multi-image printers, they function basically the same.

The lower compartment 17 is the lens cabinet. This one contains two sets of primary optics. This arrangement is well known in the prior art, providing a capacity on line for printing two different negative sizes. But in this machine there is on line a choice of 12 sizes. At the right one set 33a through 33f serves the six larger sizes of negative apertures. At the left another set 34a through 34f serves the remaining six smaller sizes. The 9-up lens array 33e is shown in operative position.

Beneath these primary optics are two secondary lens carrier sub-assemblies 40 and 41. The carrier on the right has a single lens 50 mounted on it, the remaining stations being empty. This lens is positioned in its operative location centered on the optical axis 18. This subassembly has a disc 45, which can rotate around pivot 47 fixed to the base 45. A motor 48 drives the disc through the gear box 49. This carrier, when equipped with all its lenses, serves the right bank of lens arrays 33a/33f.

A second carrier subassembly 40, shown in a stored position, has its normal complement of 6 secondary components mounted thereon. This unit is adapted to serve the bank of primary arrays 34a/34f on its side of the lens cabinet.

Sub-assembly 41 is positioned for operation, but by moving both units to the right the other set of secondary components can be accessed.

In use, light from the lamphouse 37 passes upward through an opening in the table top, through the negative 36, through the secondary optics 50, through the primary array of nine individual objectives which constitute the 9-up primary array, and thence to project the images of nine wallet prints on the sensitized material 28.

The details of the lens carrier mechanism will be made clearer by examining FIG. 2, which shows it somewhat as it might be seen when outside the printer. The left and right sub-assemblies 40 and 41 are mirror images of each other, having the base 45, to which is fixed the pivot 47, on which is mounted the circular carriers 46, each with the capacity for six secondary lenses. A gear train is driven by the pinion 53 attached to the shaft of the motor 48, indicated by the dashed outline. This drives the carrier through the intermediate gear 52. A slot 54 in the table acts as a guideway to engage with keys on the under side of the twin bases, permitting accurate line up with the optical axis.

An alternate driving mechanism for operating the lens carriers is depicted in FIG. 8. While it can only advance the components in a single direction, it is simpler. The unit at the left is in off line condition. The circular carrier 100 has a series of notched in its edge, equal in number to the lenses 51 mounted thereon. This carrier is pivoted in the center 120, A pilot pin 104 engages a notch locking the carrier against rotation. The drive pawl 105 is in its home location.

The right hand unit, a mirror image of the first, is ready to advance the station. The pilot pin 106 is withdrawn, the pawl 107 has engaged a notch and will move downward ending in position indicated by the dashed outline 107A. The cycle will be completed by the pilot pin reentering its next notch, and the pawl returning to its home position. By repetition of this action any component can be moved into operation position.

A strip of sample prints is illustrated in FIG. 12. An 11×14 print 101, is followed by a single 8×10 102, with a pair of 5×7 103, a 4-up 104, a 9-up 105, and a 16-up 106. The last three blocks are shown without images. It will be noted that some of the heads are vertical, and others are rotated. This requires that means be provided to rotate the photographic negative during the printing of a package.

In FIG. 13 a turntable 110 is mounted flush with the table top, the flat circular surface 111 has a rectangular opening 112 to allow light from the lamphouse to be passed. At the right side of the opening is a Z shaped retaining guide 113. On the left side the guide is divided into two sections 114 and 115, with a spring loaded latch 116 positioned between the sections.

Cooperating with this mount, are a series of negative holders, one for each negative size. The base of such a negative holder is shown in FIG. 14. It has a smooth flat top 118, with an aperture to suit the size negative to be accommodated. The two sides 120 are bent down, and then outward to form the flanges 121—121. A notch 122 in the left flange engages with the latch 118 to secure the holder against the force during rotation. Each holder base has the height of the vertical portions 120 matched to its aperture opening so that the negative is held in the proper focal plane. Not shown are the means for clamping the negative to the top surface 118.

Each negative holder can be coded with notches in one of its flanges, or electrical contacts so that whenever a certain holder is used, the corresponding secondary component is automatically placed into operating position.

A complete multi-image printer is quite complex, it has a great variety of masking options, and other features. To keep this description as simple as possible, reference to features well known in the art, but not pertinent to this invention have been omitted.

Having described this invention, what is claimed is new is:

1. A multi-image photographic printer including, on a common optical axis, a light source, a negative holder having an aperture therein, supporting means with an opening therein for sensitized material; a set of primary objective lens arrays, designed to serve a virtual negative, arranged in a stored location adjacent to said optical axis; actuating means adapted to move any selected lens arrays into operating position onto the optical axis; a secondary optical component located between the primary lens arrays and their virtual negative plane, said secondary component acting to permit the printing of a real negative of a size different from that of the virtual negative; the primary objective lens arrays and the secondary optical components each having designed aberration residuals of opposite nature, whereby when used together the residuals act to cancel each other.

2. A printer according to claim 1, in which the aperture of the virtual negative is smaller than the real negative apertures.

3. A printer according to claim 1, in which the residuals are the result of undercorrecting both the primary objective lens arrays, and the secondary component.

4. A printer in accordance with claim 1, in which a plurality of exchangeable secondary components are provided, one for each negative size to be printed.

5. A printer in accordance to claim 4, in which said secondary components are mounted in a carrier to facilitate rapid interchange.

6. A printer in accordance with claim 5, in which a separate negative holder is provided for each secondary component, each designed to hold a negative in the correct focal plane for a certain component, said holder having coded means to cause the carrier to place its corresponding component into operating position.

7. A printer according to claim 1, which includes two sets of primary lens arrays, each set having its own group of secondary components.

* * * * *